W. H. DOTY.
MIXING APPARATUS.
APPLICATION FILED APR. 11, 1913.
1,122,876.
Patented Dec. 29, 1914.
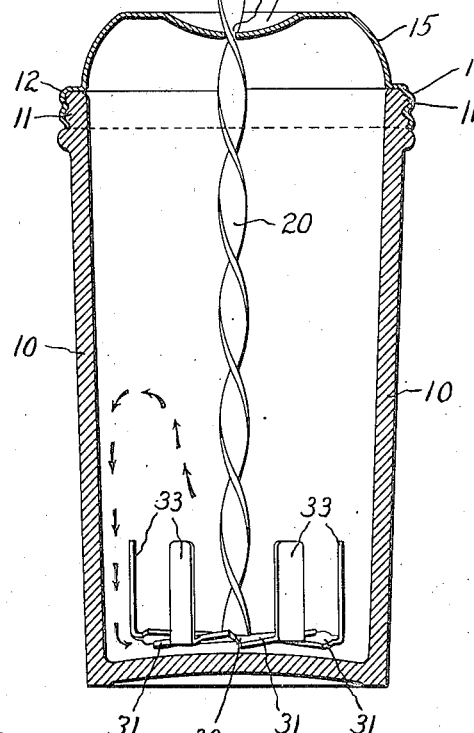
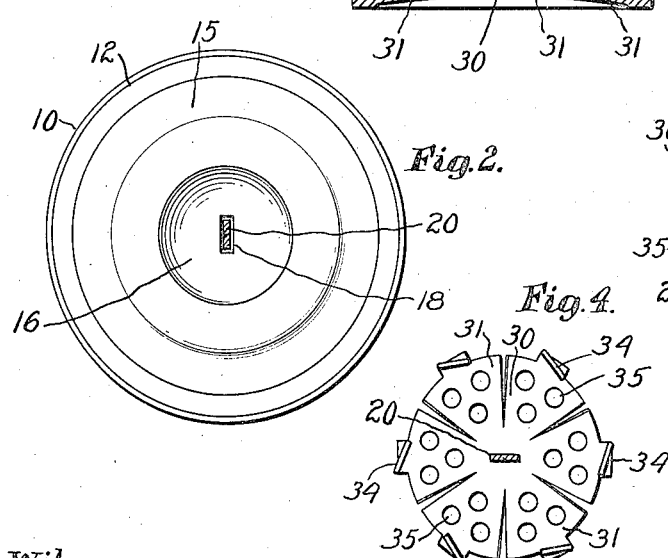
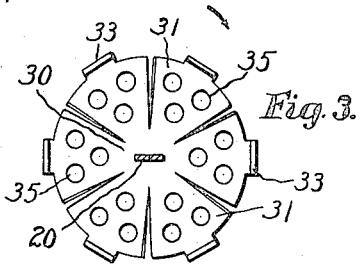
Witnesses:
Arthur T. Randall.
Maud E. Organ.
Inventor:
William H. Doty,
by Edwin T. Luce
Atty.

UNITED STATES PATENT OFFICE.

WILLIAM H. DOTY, OF WEST SOMERVILLE, MASSACHUSETTS.

MIXING APPARATUS.

1,122,876.  Specification of Letters Patent.  Patented Dec. 29, 1914.

Application filed April 11, 1913. Serial No. 760,444.

*To all whom it may concern:*

Be it known that I, WILLIAM H. DOTY, a citizen of the United States, and a resident of West Somerville, county of Middlesex, State of Massachusetts, have invented an Improvement in Mixing Apparatus, of which the following description, in connection with the accompanying drawing, is a specification, like characters on the drawing representing like parts.

This invention relates to mixing apparatus for mixing or beating liquids and semi-liquids and pertains more particularly to a device automatically operated to mix, beat, or stir liquids and semi-liquid ingredients of food or drink.

For the purpose of illustrating my invention I have disclosed in the accompanying drawing a single embodiment thereof, it being understood therefore that the invention is not specifically limited thereto.

In the drawing Figure 1 represents a central vertical section of an apparatus embodying my invention. Fig. 2 is a plan thereof showing the handle removed and the plunger rod in section. Fig. 3 is a plan of the plunger shown in Fig. 1, and Fig. 4 is another embodiment of the said plunger.

It is understood that the terms employed herein to designate the different elements and parts are used in the generic and descriptive sense and are not limitations of my invention. The said limitations will be pointed out in the claim appended hereto.

In the drawing 10 represents the body of a vessel or container preferably of glass or any other suitable material and into which liquids or semi-liquids are placed preparatory to mixing or beating the same. This vessel may be of any suitable form or configuration best adapted for the purpose for which it is desired. Preferably the said vessel is cylindrical and is relatively deeper than the diameter thereof. At the top of said vessel there is provided a screw thread 11 or the like adapted to be engaged by a similarly screw threaded portion 12 on a removable cover 15. The said cover may be of any suitable cross sectional contour and is preferably provided with a central depression 16 for a purpose to be hereinafter described. Axially of the cover and of the same depressed portion 16 I provide an orifice 18 the perimeter of which is other than circular or round. That is it may be rectangular or triangular or any other polygonal configuration or it may be semi-circular or semi-polygonal or both. Herein for example, I have illustrated the same as being rectangular. Through the orifice 16 extends a plunger rod 20 the cross section of which corresponds to the shape of the orifice 18 and herein shown as rectangular. If the said orifice was of any other configuration the said cross section of the said plunger rod would be of the same configuration as the orifice. The plunger rod 20 is twisted in such manner as to give a spiral like form thereto. The said rod is adapted to be reciprocated through the orifice 18 and when this is done the spiral like form of said rod will cause it to rotate axially. At the top of said plunger rod and above the cover 15 is a round stud 22 passing through and rotatable in the bore 23 of the handle or knob 24. At the top of said stud and above the handle 24 is a head 25 to prevent the said handle being withdrawn from said stud.

At the lower end of the plunger rod 20 and beneath the cover 15 the said rod is provided with a plunger 30 rigidly secured to the rod. The said plunger 30 is of smaller diameter than the diameter of the interior of the vessel 10 and is composed of a plurality of sectors 31. These sectors 31 rotate and partake of a propeller like movement when the said plunger is moved upward or downward and is thereby rotated. The outer edges of the said sectors 31 are provided with integral radial projections 33 bent upward or axially of the said plunger and plunger rod. The said projections are relatively thin and wide and may extend concentrically one to the other as in Fig. 3, or the said projections may be twisted like the projections 34 in Fig. 4 so that the plane thereof is tangential one to the other. Preferably each sector is provided with a plurality of orifices 35 extending therethrough for the purpose hereinafter described.

The application and operation of my invention is as follows:—The cover 15 is unscrewed and removed from the vessel 10. Carried with it and removed by the said cover is the plunger 30, plunger rod 20 and handle 24. The vessel is then open to receive any ingredients that may be placed therein. When it is desired to beat, stir, or mix any liquids or semi-liquids as for example, milk and sugar and other ingredients to make cake frosting or to mix or beat eggs or like semi-liquid ingredients with other ingredients, the said ingredients whatever they may be are placed in the vessel 10. The cover 15 is placed above the mouth of the vessel 10 and the plunger 30 is projected into the vessel. The said cover is then brought down until the threaded portion 12 thereon engages with the threaded portion 11 on the vessel and the cover is rotated until the said screw threaded portions engage and the cover is screwed down tight against the top of the vessel. Part of the plunger rod 20 and the handle 24 project above the cover and the plunger 30 is in the vessel 10. The operator grasps the vessel with one hand and the handle 24 with the other hand. The handle 24 is moved rapidly up and down carrying with it the plunger rod 20. Assuming that at the beginning of the operation the plunger is down and resting against the bottom of the vessel 10, the operator moves the said rod upward and the spiral thereof engaging the orifice 18 will cause the said plunger to rotate in the direction of the arrow Fig. 3. This movement also rotates the plunger 30 in the ingredients and at the same time the plunger 30 is moved from the bottom of the vessel to the top of the said ingredients. When this occurs several currents will be set up in the liquids. The sectors, by the reason of the propeller like action when rotated, will drive the liquid toward the top of the vessel and at the same time will impart thereto a rotary movement. This will set up currents from the center of the mass toward the sides of the vessel and downward therealong as shown in full line arrows in Fig. 1. As the sectors ascend the liquid will be lifted from the bottom of the vessel and pulled up between said blades and through the orifices 35 and will be propelled up centrally and downward as described. The projections 33 or 34 as the case may be impart a stirring and cutting action to the liquid but the sectors 31 will tend to keep the liquid more nearly toward the center and keep it from riding up on the sides of the vessel and thereby form a vortex in the revolving mass. When the plunger 30 has been raised to such a height as necessary and this depends upon the depth of the liquid in the vessel, the plunger rod 20 is moved downward by the operator. When this commences the sectors 31 will start to rotate in the reverse direction and the sectors will drive the liquid downward centrally of the plunger and form upward currents at the side of the vessel and the rotation of the liquid will be in the reverse direction to the currents imparted by said plunger when the plunger was moved upward. The liquid above the plunger will be drawn downward and centrally of the mass and will follow the upward currents and reverse rotation and thus insure a proper commingling of the ingredients. When the plunger reaches the lowest position it is again started upward and the sectors 31 again reverse the direction of the currents and force the liquid upward centrally and down the sides of the vessel. In the case of the projections 34 being employed the rotation thereof about the axis of the rod 20, the movement thereof through the liquid in addition to rotating the liquid the said projections will deflect the liquid in or out depending upon the direction of rotation of the sectors 31 thereby setting up additional counter currents and causing the proper and even commingling of the liquid. It will be understood that the sectors 31 not only impart a rotary movement to the liquid and therefore do not depend for their effectiveness upon their more rapid passage through the liquid than the rotation of the liquid itself but said sectors in addition will impart to the liquid upward and downward currents and prevent the liquid from forming vortices against which any common dasher will ineffectually operate. The orifices 35 assist in the operation of the sectors 31 in that the liquid may readily pass therethrough in whatever direction the sectors may be moving and will therefore readily displace the upward or downward moving sectors as the case may be to prevent the formation of air cavities or vacuum spaces above or below said sectors. When the plunger rod 20 is moved upward or downward more or less of the liquid may adhere to the rod and pass through the orifice 18 and when the rod is moved downward the liquid will be scraped off the rod and be deposited on the top of the cover. The depressed portion 16 is to prevent this liquid from running over the top of the cover and down the sides thereof making the operation of mixing more or less objectionable. The liquid on the stop of the cover at the next reverse movement of the operation will repass through the orifice 18 and reënter the vessel 10. When the liquid has been stirred, or mixed to the required degree the operator will cease to reciprocate the plunger rod and unscrew and remove the cover and the said plunger, and the ingredients may be utilized as desired. The sectors 31 will beat or stir the liquid or semi-liquid and produce a complete commingling thereof in much shorter time than it could be done with any other type of dasher and the liquid will not be spattered up the sides of the vessel and on the interior of the cover as is the case with similar devices of this character.

I have described herein one embodiment of my invention; but it is to be understood that the latter is not essentially limited to the specific details of construction and organization of said embodiment, since the same may be varied without departing from the proper scope of the claim.

Claim:

In a device of the character described comprising a spiral rod adapted to engage the edges of an orifice to cause said rod to rotate when it is reciprocated, a plunger comprising a plurality of foraminous sectors secured at their inner ends to the bottom of said rod, said sectors having their adjacent edges in the same vertical plane separated one from the other, said sectors being inclined from the horizontal throughout the entire circumferential extent thereof, and vertical deflecting blades on said sectors extending above the same and inclined to the plane of rotation.

In testimony whereof, I have signed my name to this specification, in the presence of two subscribing witnesses.

WILLIAM H. DOTY.

Witnesses:
 ARTHUR I. FREEDMAN,
 HENRY P. KIETH.